United States Patent
Bryant

(10) Patent No.: US 11,294,394 B2
(45) Date of Patent: Apr. 5, 2022

(54) METHOD AND APPARATUS FOR GIG ECONOMY TRANSPORTATION OF DELIVERY PODS

(71) Applicant: GM GLOBAL TECHNOLOGY OPERATIONS LLC, Detroit, MI (US)

(72) Inventor: Wade W. Bryant, Grosse Pointe Farms, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 181 days.

(21) Appl. No.: 16/561,488

(22) Filed: Sep. 5, 2019

(65) Prior Publication Data

US 2021/0072767 A1  Mar. 11, 2021

(51) Int. Cl.
*G05D 1/02* (2020.01)
*G01C 21/34* (2006.01)
(Continued)

(52) U.S. Cl.
CPC ........... *G05D 1/0276* (2013.01); *G01C 21/34* (2013.01); *G05D 1/0088* (2013.01); *G06Q 20/10* (2013.01)

(58) Field of Classification Search
CPC ........... G05D 1/0088; G06Q 10/08355; G06Q 10/0833; G06Q 10/083; G06Q 10/047; G06Q 10/0834; G06Q 10/08; G06Q 50/30; G06Q 10/06312; G06Q 10/06315; G06Q 10/0832; G06Q 10/0835; G06Q 10/0836; G06Q 10/0838; G06Q 50/28; G01C 21/3492; G01C 21/343; G01C 21/32; G01C 21/3461; G01C 21/3804; G01C 21/34; G01C 21/3415; G01C 21/3438; G01C 21/34446; G01C 21/3453; G01C 21/3617; G01C 21/3664; G06F 16/29; G08G 1/202; G08G 1/096844; H04W 4/024; H04W 4/029; H04W 4/44; B32B 21/042; B32B 21/047; B32B 21/10; B32B 2262/101; B32B 27/065; B32B 5/245; B32B 5/26; B32B 5/32; B62B 2307/732; B63B 2231/34; B63B 2231/52; B63B 32/50; B63B 32/57; B64C 2201/027; B64C 2201/128; B64C 39/024; G06K 7/1408;
(Continued)

(56) References Cited

U.S. PATENT DOCUMENTS 5,880,958 A * 3/1999 Helms ............... G08G 1/202
                                           701/117
8,991,529 B2   3/2015 Bryant et al.
(Continued)

*Primary Examiner* — Alexander G Kalinowski
*Assistant Examiner* — Sanjeev Malhotra
(74) *Attorney, Agent, or Firm* — Lorenz & Kopf LLP

(57) ABSTRACT

The present application relates to a method and apparatus for delivery a cargo pod including receiving a delivery request for a delivery pod wherein the delivery request includes a delivery origin and a delivery destination, generating a delivery route in response to the delivery origin and the delivery destination, receiving a first navigational route from a first host vehicle, transmitting a first host request to the first host vehicle in response to a first segment of the delivery route matching a segment of the first navigational route, and receiving a delivery completion indication from the first host vehicle in response to a towing operation of the delivery pod and a completion of the first segment of the delivery route.

17 Claims, 3 Drawing Sheets

(51) Int. Cl.
*G05D 1/00* (2006.01)
*G06Q 20/10* (2012.01)

(58) Field of Classification Search
CPC . G07C 5/008; H04L 2209/38; H04L 2209/56; H04L 67/12; H04L 9/0637; H04L 9/3236; H04L 9/3239; H04L 9/3247; H09L 9/3297
USPC ....... 701/117, 333, 337, 412, 467, 519, 533, 701/537; 705/332, 333, 337, 338
See application file for complete search history.

(56) References Cited

U.S. PATENT DOCUMENTS

| | | | | |
|---|---|---|---|---|
| 2003/0101069 A1* | 5/2003 | Sando | ................ | G06Q 10/083 705/337 |
| 2005/0096840 A1* | 5/2005 | Simske | ............ | G08G 1/096883 701/533 |
| 2005/0288986 A1* | 12/2005 | Barts | ...................... | G06Q 10/08 705/338 |
| 2006/0116893 A1* | 6/2006 | Carnes | ............... | G06Q 30/0201 705/333 |
| 2008/0275643 A1* | 11/2008 | Yaqub | ................. | G01C 21/343 701/412 |
| 2011/0106436 A1* | 5/2011 | Bill | .................... | G01C 21/3492 701/467 |
| 2014/0163879 A1* | 6/2014 | Nesbitt | .................. | G01C 21/34 701/533 |
| 2015/0278759 A1* | 10/2015 | Harris | ................... | H04W 4/024 705/338 |
| 2015/0338220 A1* | 11/2015 | Choi | ...................... | G01C 21/26 701/537 |
| 2016/0019497 A1* | 1/2016 | Carvajal | ............... | H04W 4/029 701/519 |
| 2016/0155086 A1* | 6/2016 | Fuller | ................ | G01C 21/3629 705/333 |
| 2016/0171434 A1* | 6/2016 | Ladden | ................ | G06Q 10/083 705/332 |
| 2016/0189102 A1* | 6/2016 | Schreiber | ......... | G06Q 10/08355 705/338 |
| 2016/0243908 A1 | 8/2016 | Lannen et al. | | |
| 2017/0083862 A1* | 3/2017 | Loubriel | ............ | G06Q 10/0835 |
| 2017/0122757 A1* | 5/2017 | Rajab | .................... | G01C 21/343 |
| 2017/0293886 A1* | 10/2017 | Bostick | ............ | G06Q 10/08355 |
| 2017/0363437 A1* | 12/2017 | Baracco | ............. | G01C 21/367 |
| 2018/0189717 A1* | 7/2018 | Cao | ...................... | G06Q 10/083 |
| 2018/0265294 A1* | 9/2018 | Hayashi | ................ | B65G 1/137 |
| 2019/0039731 A1* | 2/2019 | Marcath | .................. | B64F 1/007 |
| 2019/0052914 A1* | 2/2019 | Anderson | ........ | H04N 21/23116 |
| 2019/0066033 A1* | 2/2019 | Mains, Jr. | ............ | G06Q 10/083 |
| 2019/0073629 A1* | 3/2019 | Becica | ............... | G06Q 10/0833 |
| 2019/0164113 A1* | 5/2019 | Fosgard | ............. | G01C 21/3415 |
| 2019/0197476 A1* | 6/2019 | Ko | .................... | G06Q 10/08355 |
| 2019/0258992 A1* | 8/2019 | Leonard | ........... | G06Q 10/06312 |
| 2019/0258999 A1* | 8/2019 | Leonard | ........... | G06Q 10/06312 |
| 2019/0304044 A1* | 10/2019 | Guo | .................... | G06Q 10/083 |
| 2019/0339712 A1* | 11/2019 | Williams | .................. | G08G 1/202 |
| 2019/0370742 A1* | 12/2019 | Ko | ..................... | G06Q 10/083 |
| 2020/0005240 A1* | 1/2020 | Ko | ......................... | G06Q 10/047 |
| 2020/0065842 A1* | 2/2020 | Viswanathan | ...... | G01C 21/3461 |
| 2020/0133268 A1* | 4/2020 | Walsh | .................. | G05D 1/0088 |
| 2020/0149910 A1* | 5/2020 | Fowe | ................ | G01C 21/3617 |
| 2020/0160265 A1* | 5/2020 | Urban | .................... | H04L 67/12 |
| 2020/0265367 A1* | 8/2020 | Mo | ........................ | G06F 16/29 |
| 2020/0286021 A1* | 9/2020 | Luckay | ................ | G06Q 10/047 |
| 2020/0338602 A1* | 10/2020 | Mo | ........................ | B07C 7/005 |
| 2020/0349511 A1* | 11/2020 | Seaver | ............. | G06Q 10/06312 |
| 2020/0377181 A1* | 12/2020 | Cheung | ............ | G06K 7/1408 |
| 2020/0380467 A1* | 12/2020 | Chen | ...................... | B32B 21/10 |
| 2020/0380798 A1* | 12/2020 | Frankel | ............. | G06Q 10/0631 |
| 2020/0386556 A1* | 12/2020 | Rolf | ................ | G01C 21/3415 |
| 2020/0388153 A1* | 12/2020 | Cajias | .................... | G01C 21/32 |
| 2021/0024100 A1* | 1/2021 | Calleija | .................... | G08G 1/207 |
| 2021/0065108 A1* | 3/2021 | Gabbai | ............... | G06Q 10/0836 |
| 2021/0090024 A1* | 3/2021 | Lafrance | .......... | G06Q 10/08355 |

* cited by examiner

METHOD AND APPARATUS FOR GIG ECONOMY TRANSPORTATION OF DELIVERY PODS

BACKGROUND

The present disclosure relates generally to programming motor vehicle control systems. More specifically, aspects of this disclosure relate to systems, methods and devices for determining a delivery route for a self-powered delivery pod and for pairing each leg of the delivery route with a volunteer host.

The gig economy is a system of temporary labor positions between independent parties to perform a specific task for a specific compensation. For example, gig economy transportation services connect a vehicle operator with a passenger to provide a single ride. The transportation service can be coordinated between a vehicle operator and a passenger that are in close proximity when the request is made, thereby reducing unpaid travel time for the vehicle operator. Compensation may be paid directly between the vehicle operator and the passenger or through a third party coordinating the transaction.

Cargo delivery has long been performed in a gig economy fashion. For example, independent truck operators may bid on jobs to transport cargo from one destination to another and are later compensated by the party requesting the service. Often this cargo is transported in shipping containers or pods which are loaded onto an appropriate transportation trailer or the like at the point of origin and delivered to the destination without ever being opened by the transportation provider. The expense of commercial drivers and the anticipated cost of full autonomous vehicle systems challenges the economics of short distance, small capacity delivery vehicles. More recently, cargo companies have been using a gig economy model with independent operators to deliver parcels and cargo between distribution centers and the final destination for the parcel, often called the "last mile." However, each of these delivery scenarios requires a driver to drive from a current location to a trip origin point uncompensated, complete the delivery at a destination for the specified compensation, and then return from the destination uncompensated. In this scenario, two of the three stages of the delivery are uncompensated for the driver. It would be desirable to facilitate deliver of cargo in a gig economy while minimizing the uncompensated travel by drivers.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a receiver operative to receive an indicator of a host vehicle for a towing operation and a destination from a service provider, a camera operative to receive an image of a field of view, an image processor for detecting the host vehicle in response to the image, a vehicle controller for controlling the delivery pod such that the delivery pod is operative to follow the host vehicle, a global positioning system sensor for detecting a current location of the delivery pod, a processor operative to discontinue the following of the host vehicle by the vehicle controller in response to a comparison the current location and the destination indicating that the delivery pod has arrived at the destination, and a transmitter operative to transmit an indication of the location of the delivery pod to the service provider.

In accordance with another aspect of the present invention an infrared receiver for receiving navigation data from the host vehicle.

In accordance with another aspect of the present invention wherein the receiver is further operative to receive navigational data from the host vehicle.

In accordance with another aspect of the present invention wherein the image processor is further operative to detect a host vehicle location and to couple the host vehicle location to the vehicle processor.

In accordance with another aspect of the present invention wherein the image processor is further operative to detect a host vehicle location and to couple the host vehicle location to the vehicle processor and wherein the vehicle processor is operative to control the delivery pod in response to the host vehicle location.

In accordance with another aspect of the present invention wherein the vehicle controller is further operative to park the delivery pod at a curbside location in response to the delivery pod arriving at the destination.

In accordance with another aspect of the present invention wherein the receiver is further operative to receive a disengage request from the host vehicle and wherein the vehicle controller is further operative to park the delivery pod at a curbside location in response to the disengage request.

In accordance with another aspect of the present invention a method including receiving a delivery request for a delivery pod wherein the delivery request includes a delivery origin and a delivery destination, generating a delivery route in response to the delivery location and the delivery origin and the delivery location, receiving a first navigational route from a first host vehicle, transmitting a first host request to the first host vehicle in response to a first segment of the delivery route matching a segment of the first navigational route, and receiving a delivery completion indication from the first host vehicle in response to a towing operation of the delivery pod and a completion of the first segment of the delivery route.

In accordance with another aspect of the present invention further operative to receive a second navigational route from a second host vehicle and wherein the method being operative to transmit a second host request in response to a second segment of the delivery route matching a segment of the second navigational route.

In accordance with another aspect of the present invention including transmitting a location request to the delivery pod and receiving the delivery origin in response to the location request.

In accordance with another aspect of the present invention including transmitting a location request to the delivery pod and confirming the delivery origin in response to the location request.

In accordance with another aspect of the present invention including transmitting a payment in response to the delivery completion indication.

In accordance with another aspect of the present invention including receiving a first host confirmation in response to the first host request and wherein the first host confirmation is indicative of the first host being operative to transport the delivery pod along the first segment of the delivery route.

In accordance with another aspect of the present invention wherein the first navigational route is received in response to a host vehicle request.

In accordance with another aspect of the present invention wherein the first navigational route is received in response to a host vehicle request transmitted to a plurality of registered host vehicles.

In accordance with another aspect of the present invention wherein the indication of the high-risk area is a geographical region determined by a remote service provider in response to publicly available highway safety data.

In accordance with another aspect of the present invention wherein the delivery route is generated in response to the first navigational route.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
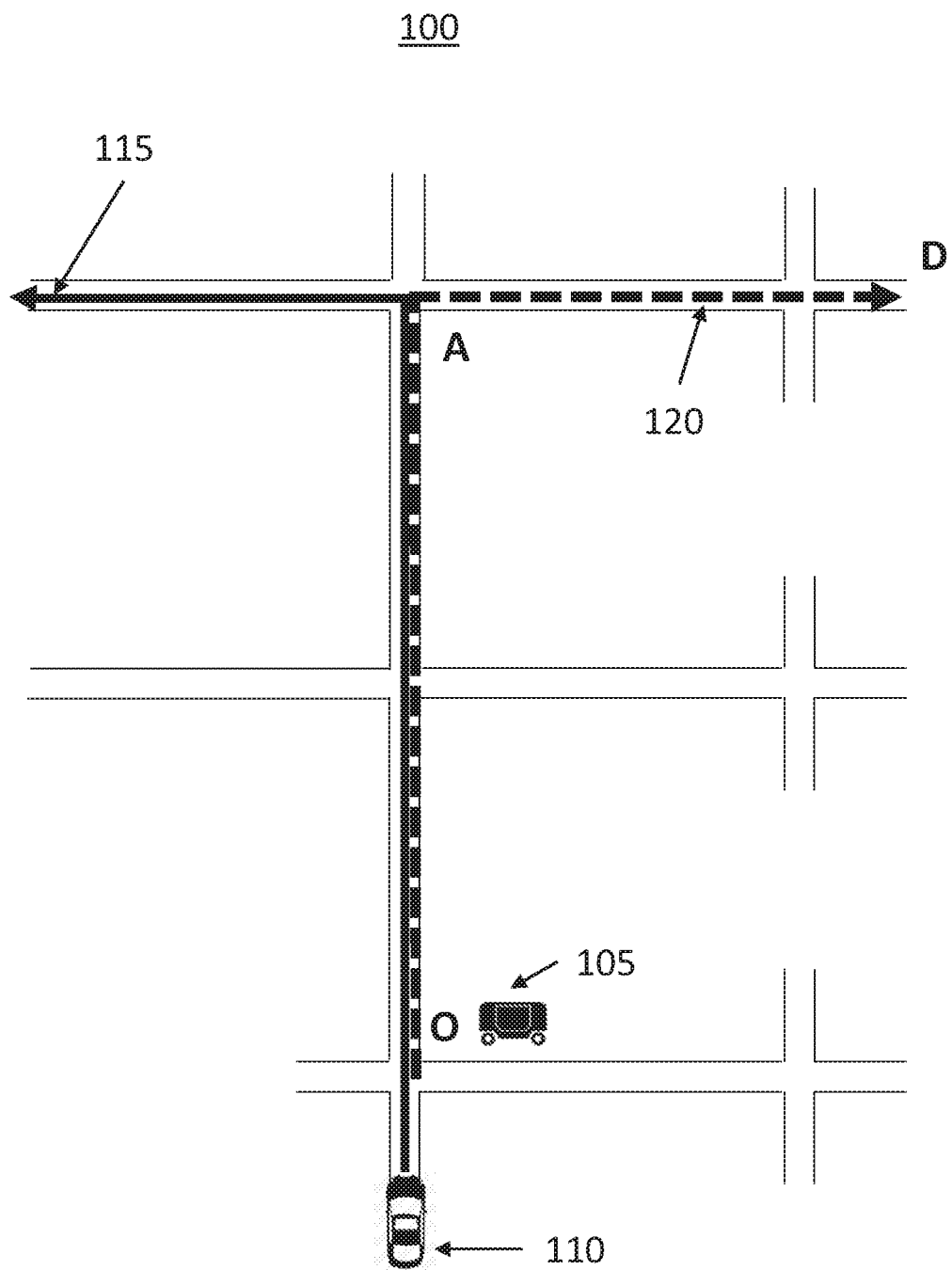
FIG. 1 shows an operating environment for providing a gig economy transportation of delivery pods according to an exemplary embodiment.

FIG. 1 schematically illustrates an operating environment 100 for providing a gig economy transportation of delivery pods. In this exemplary embodiment of the present disclosure, the proposed system is operative to facilitate the transportation of a driverless, self-powered delivery pod 105 from an origin (O) to a destination (D) over various roadways. In the currently proposed process facilitates a specially-equipped, self-powered delivery pod, such as a hitchless trailer to be led, untethered to its destination by a driven passenger vehicle while the passenger vehicle driver is on route to personal destination.

The exemplary system first discloses a process of pairing delivery pods, such as unpowered hitched or self-powered hitch-less trailers to gig economy volunteer hosts, such as drivers in personal vehicles for navigation of the delivery pod to a final destination or to an intermediate destination on route to the final destination. The exemplary delivery method may be operative to match delivery requests to a fleet of delivery pods and any number of volunteer hosts along congruent partial routes using a web application that is tied to existing navigation applications is novel. While this methodology may be applied to hitched trailers, it may also involve a self-powered trailer delivery pod operative to detect, and intercept a driven vehicle, then self-park is a novel concept.

In an exemplary application, the vehicle 110 is driving is travelling on a route 115 predetermined route 115 in response to the programming of a navigation system or the like. A processing system onboard the vehicle 110 are then operative to use map data stored in a memory in the vehicle 110 to generate the predetermined route 115. Similarly, a service provider may determine a requirement for a delivery pod to be transported between an origin (O) and a destination (D). The service provider may determine a delivery route 120 for the delivery pod 105 to be transported along. The service provider may then poll proximately located vehicles which have opted in to performing the navigation service for the delivery pods. In response to the poll, the vehicle 110 may transmit the current route 115 generated by the navigation system to the service provider. The service provider may match a portion of the current route 115 to the delivery route 120, in this exemplary embodiment between the origin (O) and a midpoint (A).

In response to a match between the current route 115 and the delivery route 120, the service provider may then be operative to provide a request to the vehicle 110 to transport the delivery pod from the origin (O) to the midpoint (A). In an example of a self-powered, hitchless, delivery pod, which is operative to follow a host vehicle in a manner similar to an unpowered trailer, but without physical contact with the host vehicle 110, the vehicle operator may be notified of the route match and may be provided an option of accepting or rejecting the match. In response to the vehicle operator accepting the match, information may be transmitted to the delivery pod 105 identifying the vehicle 110, such as location provided by a global positioning system (GPS), an encoded beacon identifier, such as a radio frequency identification (RFiD), and/or visual information about the vehicle 110.

In response to receiving the vehicle 110 information, the delivery pod 105 may be positioned curbside at the origin (O) and may be operative to identify the vehicle 110, using the provided identifying information and/or visual recognition. The delivery pod 105 may next intercept the moving vehicle 110 by visually locking onto the vehicle, estimating an approach speed of the vehicle 110, determine if there is sufficient space around the vehicle 110 to perform a merge maneuver, and to intercept the vehicle 110 from the curbside location if it is safe to do so.

The delivery pod 105 may then follow the vehicle along a route segment where the current route 115 and the delivery route 120 overlap. The delivery pod 105 and the vehicle 110 may communicate through a vehicle to vehicle (V2V) communications protocol, a WiFi V2V transmission, a visual-IR emitter and detector or camera, using ultrasonic parking sensors or via a laser rangefinder. When the delivery pod 105 reaches a midpoint (A) of the delivery route 120 where the delivery route 120 and the original route 115 no longer overlap, the delivery pod 105 may disengage and the midpoint (A) and await another vehicle to complete the delivery route 120 navigation. In order to disengage from the vehicle, 110, the delivery pod 105 may receive instructions from the service provider to disengage and park. The service provider may further provide a signal to the delivery pod 105 to search for an appropriate curbside gap to park in. The delivery pod 105 may then search for a curbside gap using onboard sensors and or GPS to search for and/or reserve a space. Once the delivery pod 105 identifies a space, the delivery pod 105 may signals a stop, navigate into the space. The delivery pod 105 may transmit a confirmation to the service provider on the parked status and the process may be repeated for an additional segment of the delivery route 120 in order to complete navigation of the delivery pod 105 to the destination (D). Any number of segments may be used to complete delivery of the delivery pod 105 from the origin (O) to the destination (D), but ideally a smaller number of segments is preferable.

Figure 2:
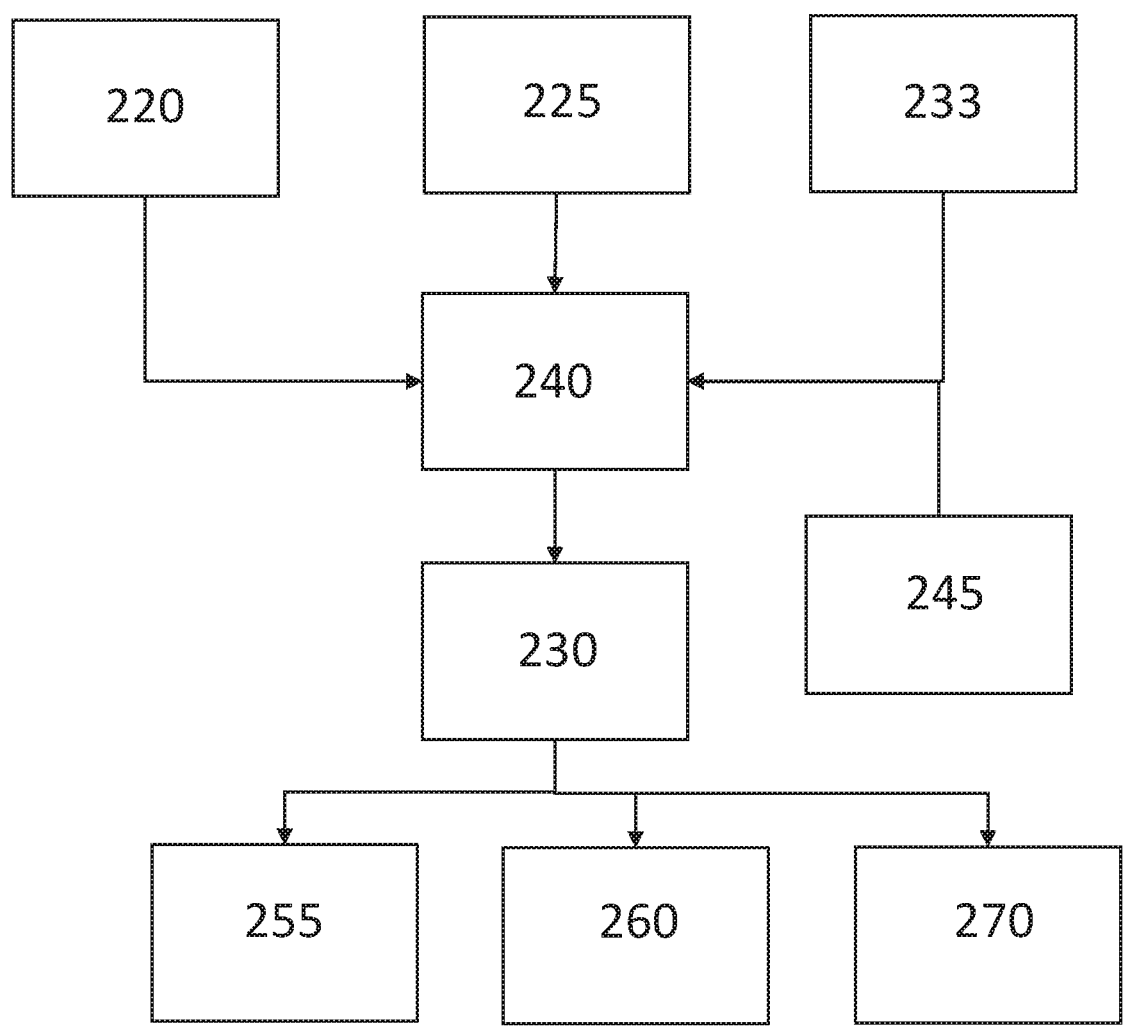
FIG. 2 shows a block diagram illustrating a system for providing a gig economy transportation of delivery pods according to an exemplary embodiment.

Turning now to FIG. 2, a block diagram illustrating an exemplary implementation of a system 200 for providing a self-powered delivery pod for a gig economy transportation of cargo is shown. The system 200 may include a processor 240, a camera 220, a transceiver 233, a global positioning system (GPS) 225, a memory 245, a vehicle controller 230 a throttle controller 255, a brake controller 260 and a steering controller 270.

The exemplary system 200 may include a transceiver 233 for transmitting and receiving information concerning a host vehicle from a service provider. The information may include current host vehicle location, visual information such as vehicle color, vehicle model, RFid data, etc. This received information may be stored in a memory 245. The transceiver 233 may be a radio frequency transmitter and receiver operative to transmit data over a cellular telephone network, vehicle to everything network (V2X), WiFi network, or over a short range communications network, such as V2V or vehicle to infrastructure (V2) network. The transceiver 233 may be further operative for communications directly with a host vehicle for transmitting navigational instructions, location and/or navigational beacon information, messages from a service provider, and/or disengagement requests. The transceiver 233 may further be operative for transmitting information to the service provider concerning successful and unsuccessful host vehicle engagements, disengagement requests, midpoint stopping locations, arrival at destination notifications, and the like.

The camera 220 may be operative to capture an image or a series of images of a field of view. In an exemplary embodiment, the camera 220 may be mounted to a delivery pod and used to identify and/or intercept a moving host vehicle, then follow, untethered along a selected congruent route by means of the following: The camera 220 may include short and long-distance image sensors in order to match a host vehicle image profiles to enroute traffic approaching the delivery pod. Image captured by the camera 220 may be coupled to a processor 240 for image processing and host vehicle detection.

The GPS 225 is operative to provide a current location of the GPS sensor to the processor 240. The GPS 225 may operative to determine a location of the vehicle in response to received satellite signals wherein the received satellite signals are indicative of a satellite location and a time of transmission. The GPS 225 is then operative to determine a location in response to a triangulation operation of the satellite locations and the time of flight of each signal.

The processor 240 may receive information from the camera and other sensors in order to engage and disengage the self powered delivery pod from the host vehicle. In response to image data from the camera 220, or additional sensors, the processor 240 is operative to detect speed and spacing of a service provider identified host vehicle and its relationship to any traffic following behind it. The processor 240 may have intelligent real-time prediction capability to judge intercept opportunity in order to avoid surrounding objects and vehicles. The processor 240 may be operative to perform image processing techniques in order to perform a visual confirmation ability to read host vehicle license plate in response to the images from the camera 220.

In exemplary embodiment where the delivery pod is a self-powered vehicle, the vehicle controller 230 may generate control signals for coupling to other vehicle system controllers, such as a throttle controller 255, a brake controller 260 and a steering controller 270 in order to control the operation of the vehicle in response to the delivery pod algorithm and the location and velocity of the host vehicle. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
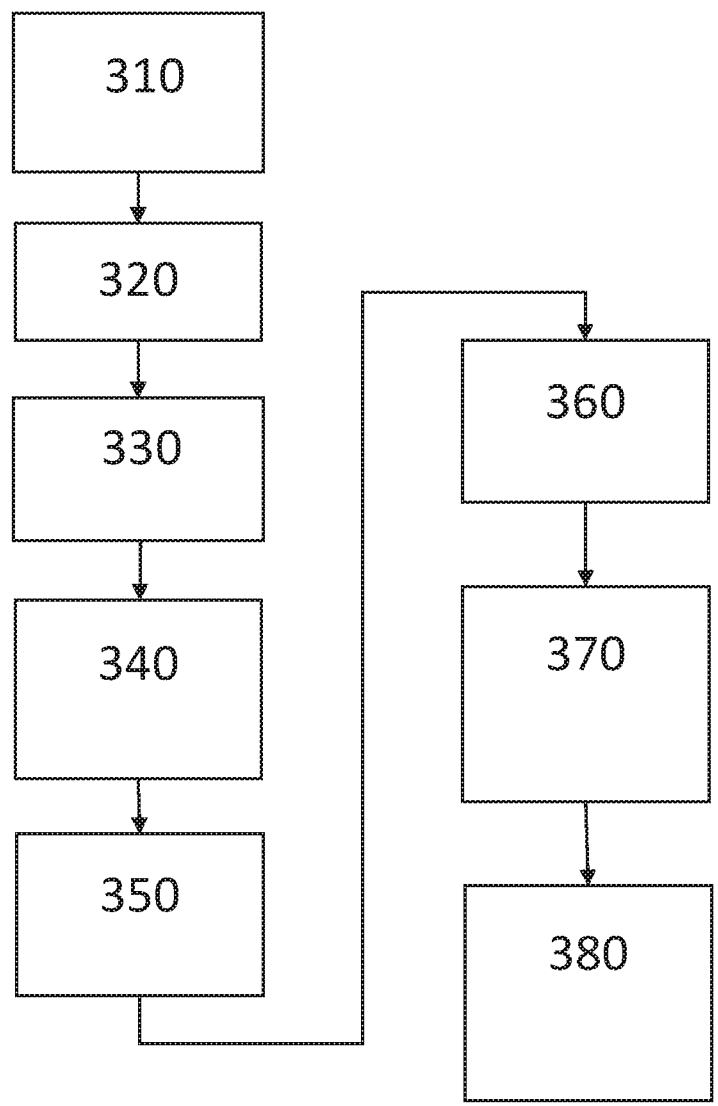
FIG. 3 shows a flow chart illustrating a method providing a gig economy transportation of delivery pods according to another exemplary embodiment.

Turning now to FIG. 3, a flow chart illustrating an exemplary implementation of a method 300 for providing a self-powered delivery pod for a gig economy transportation of cargo is shown. The exemplary method facilitates the delivery of a delivery pod to be directed between a first location and a second location along a delivery route by a host vehicle.

In this exemplary embodiment, the method is operative to first receive 310 a delivery request identifying a delivery pod transportation request. The request may be generated via a user application on a computer or mobile device and may be received via a wireless network, such as a mobile data network, or via the internet. The delivery request may be indicative of a delivery origin, a delivery destination, a deadline, delivery size and weight, delivery pod identifier and/or delivery pod type.

The method is next operative to match 320 delivery requests to a delivery pods near the delivery location. The method may be operative to transmit a beacon in the delivery origin location to initiate communications with the intended delivery pod. The exemplary system may then receive a confirmation from the intended delivery pod in response to the request.

The method is next operative to receive 330 a current location and a navigational route from a host driver indicative of a current route of the host driver. The navigational route may be indicative of approximate times of predicted arrival at various points along the navigational route. The method may receive a number of navigational routes from a number of host drivers. The navigational route may be received in response to a request transmitted to proximate drivers who have opted in to the delivery service. In an alternative embodiment, the method may be operative to continuously collect route data from opted in host drivers and to generate a potential route map of potential delivery routes in response to the aggregated navigational routes. These destinations may be monitored via a mobile device app, vehicle navigation system, or the like.

The method is next operative to generate 340 a delivery route in response to the received navigational routes. The exemplary method may compare the various navigational routes, expected times of arrival to generate the delivery route. The delivery route may include pick-up locations, midpoints for handoff between host vehicles and destinations for each segment. The method may consider shortest delivery time possible, minimum number of handoffs, midpoint locations, and possible routes in determining the optimal delivery route.

The method is next operative to transmit 350 the individual delivery route segment indicator sot the selected host vehicles. The segment indicators may include a confirmation to the host vehicle to notify the vehicle operator of the pending pairing. The notification may include time and location of the pairing as well as an indicator the navigational route of the individual delivery route segment.

The method is next operative to transmit 350 instructions to the delivery pod to intercept the next matched host driven vehicle. Vehicle is paired to Delivery Pod (tethered or untethered methods are possible) and Delivery Pod follows host until routes diverge. The method may further be operative to receive 370 a notification of the completion of a route segment from the delivery pod and/or arrival at the destination of the delivery pod. The method may then initiate 380 a payment to the host vehicle for the segment completed.

In an exemplary embodiment, the method is performed by a processor in an ADAS equipped vehicle and the processor is further operative to control the vehicle along the second navigational route. The processor may be further operative to predict an advanced driving assistance system disengagement event in response to the indication of the high-risk area and generate a driver warning in response to the prediction. The driver warning may be displayed on a user interface or may be an audible alarm played within the vehicle cabin of the ADAS equipped vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A delivery pod comprising:
   a receiver operative to receive a delivery request for the delivery pod wherein the delivery request includes a delivery origin and a delivery destination;
   a processor operative to generate a delivery route in response to the delivery origin and the delivery destination, to receive a first navigational route from a first host vehicle and a second navigational route from a second host vehicle, to determine if a first segment of the delivery route matches a segment of the first navigational route by comparing the delivery route to the first navigational route, to transmit a first host request to the first host vehicle to perform a towing operation of the delivery pod over the segment of the first navigational route in response to the first segment of the delivery route matching the segment of the first navigational route, to receive a delivery completion indication from the first host vehicle including a midpoint location in response to the towing operation of the delivery pod and a completion of the first segment of the delivery route and transmitting a second host request to the second host vehicle in response to the delivery completion indication and a second segment of the delivery route starting at the midpoint location matching a segment of the second navigation route, wherein the processor is further configured to receive a first host confirmation in response to the first host request and wherein the first host confirmation is indicative of the first host being operative to transport the delivery pod along the first segment of the delivery route.

2. The delivery pod of claim 1 wherein the receiver is further operative to receive navigational data from the host vehicle.

3. The delivery pod of claim 1 wherein the processor is further configured to transmit a location request to the delivery pod and confirming the delivery origin in response to the location request.

4. The delivery pod of claim 1 wherein the processor is further configured to transmit a payment in response to the delivery completion indication.

5. The delivery pod of claim 1 wherein the first navigational route is received in response to a host vehicle request.

6. A method comprising:
   receiving a delivery request for a delivery pod wherein the delivery request includes a delivery origin and a delivery destination;
   generating a delivery route in response to the delivery origin and the delivery destination;
   receiving a first navigational route from a first host vehicle and a second navigational route from a second host vehicle;
   determining if a first segment of the delivery route matches a segment of the first navigational route by comparing the delivery route to the first navigational route;
   transmitting a first host request to the first host vehicle to perform a towing operation of the delivery pod over the segment of the first navigational route in response to the first segment of the delivery route matching the segment of the first navigational route;
   receiving a first host confirmation in response to the first host request and wherein the first host confirmation is indicative of the first host being operative to transport the delivery pod along the first segment of the delivery route;
   receiving a delivery completion indication from the first host vehicle including a midpoint location in response to the towing operation of the delivery pod and a completion of the first segment of the delivery route, and
   transmitting a second host request to the second host vehicle in response to the delivery completion indication and a second segment of the delivery route starting at the midpoint location matching a segment of the second navigation route.

7. The method of claim 6 further including transmitting a location request to the delivery pod and receiving the delivery origin in response to the location request.

8. The method of claim 6 further including transmitting a location request to the delivery pod and confirming the delivery origin in response to the location request.

9. The method of claim 6 further including transmitting a payment in response to the delivery completion indication.

10. The method of claim 6 receiving a first host confirmation in response to the first host request and wherein the first host confirmation is indicative of the first host being operative to transport the delivery pod along the first segment of the delivery route.

11. The method of claim 6 wherein the first navigational route is received in response to a host vehicle request.

12. The method of claim 6 wherein the first navigational route is received in response to a host vehicle request transmitted to a plurality of registered host vehicles.

13. The method of claim 6 further including transmitting a host vehicle indicator to the delivery pod in response to transmitting the first host request.

14. The method of claim 6 wherein the delivery route is generated in response to the first navigational route.

15. An apparatus comprising:
- a receiver operative to receive an indication of a delivery pod location and delivery destination, the receiver being further operative to receive a first navigation route from a first host vehicle and a second navigation route from a second host vehicle;
- a processor operative to determine a delivery route in response to the delivery pod location and the delivery destination, to compare the delivery route to the first navigation route to determine if a portion of the delivery route overlaps a portion of the first navigational route, to determine a waypoint in response to the portion of the delivery route overlapping with the portion of the first navigation route wherein the delivery pod location is the start of the portion of the delivery route overlapping with the portion of the first navigation route and the waypoint is the end of the portion of the delivery route overlapping with the portion of the first navigation route;
- a transmitter configured to transmit a first host vehicle request to the first host vehicle to perform a first towing operation of the delivery pod over the portion of the first navigational route wherein the first host vehicle request includes the delivery pod location, the waypoint, and a delivery pod indicator to the host vehicle and a second host vehicle request to the second host vehicle to perform a second towing operation of the delivery pod over a portion of the second navigational route wherein the second host vehicle request includes the waypoint, the delivery destination and the deliver pod indicator; and
- wherein the processor is further configured to receive a first host confirmation in response to the first host vehicle request and wherein the first host confirmation is indicative of the first host vehicle being operative to transport the delivery pod along the portion of the delivery route overlapping with the portion of the first navigation route.

16. The apparatus of claim 15 wherein the transmitter is further operative to transmit the first host vehicle request in response to receiving the indication of the delivery pod location.

17. The apparatus of claim 15 wherein the transmitter is further operative to transmit a host vehicle indicator to the delivery pod.

* * * * *